United States Patent
Walter et al.

(10) Patent No.: US 12,260,529 B2
(45) Date of Patent: Mar. 25, 2025

(54) IMAGE PROCESSING APPARATUS AND METHOD FOR ENHANCING A PHASE DISTRIBUTION

(71) Applicant: LEICA MICROSYSTEMS CMS GMBH, Wetzlar (DE)

(72) Inventors: Kai Walter, Schriesheim (DE); Benjamin Deissler, Butzbach (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 526 days.

(21) Appl. No.: 17/620,777

(22) PCT Filed: Jun. 19, 2020

(86) PCT No.: PCT/EP2020/067096
§ 371 (c)(1),
(2) Date: Dec. 20, 2021

(87) PCT Pub. No.: WO2020/254574
PCT Pub. Date: Dec. 24, 2020

(65) Prior Publication Data
US 2022/0357558 A1 Nov. 10, 2022

(30) Foreign Application Priority Data
Jun. 21, 2019 (EP) .................................... 19181836

(51) Int. Cl.
*G06T 5/10* (2006.01)
*G02B 7/38* (2021.01)
(Continued)

(52) U.S. Cl.
CPC .................. *G06T 5/73* (2024.01); *G02B 7/38* (2013.01); *G02B 21/12* (2013.01); *G02B 21/244* (2013.01);
(Continued)

(58) Field of Classification Search
CPC .............. G06T 5/10; G06T 5/70; G06V 10/30
See application file for complete search history.

(56) References Cited

U.S. PATENT DOCUMENTS

2009/0092319 A1 4/2009 Sakamoto et al.
2013/0321908 A1 12/2013 Babacan et al.

FOREIGN PATENT DOCUMENTS

EP  3 156 937 A1  4/2017
JP  2009/103695 A  5/2009

OTHER PUBLICATIONS

Amaya, Kenji et al.; "Inverse Problem of Phase Distribution Identification using Intensity Images"; *C Hen/Transactions of the Japan Society of Mechanical Engineers*; May 1, 2006; pp. 1478-1485; vol. 72, No. 717, Part C; Nippon Kikai Gakkai Ronbunshu; Tokyo, Japan.

Oller-Moreno, Sergio et al.; "Adaptive Asymmetric Least Squares Baseline Estimation for Analytical Instruments"; *2014 IEEE 11th International Multi-Conference on Systems, Signals & Devices (SSD14)*; May 1, 2014; pp. 1-5; ISBN:978-1-4799-3866-7; IEEE; Piscataway, NJ, USA.

(Continued)

*Primary Examiner* — Chan S Park
*Assistant Examiner* — Sebastian-Sy Vuchi Ngo
(74) *Attorney, Agent, or Firm* — LEYDIG, VOIT & MAYER, LTD.

(57) ABSTRACT

An apparatus for enhancing an input phase distribution ($I(x_i)$) is configured to retrieve the input phase distribution ($I(x_i)$) and compute a baseline estimate ($f(x_i)$) as an estimate of a baseline ($I_2(x_i)$) in the input phase distribution ($I(x_i)$). The apparatus is further configured to obtain an output phase distribution ($O(x_i)$) based on the baseline estimate ($f(x_i)$) and the input phase distribution ($I(x_i)$).

15 Claims, 7 Drawing Sheets

(51) Int. Cl.
  *G02B 21/12* (2006.01)
  *G02B 21/24* (2006.01)
  *G06F 17/13* (2006.01)
  *G06F 17/15* (2006.01)
  *G06T 5/20* (2006.01)
  *G06T 5/70* (2024.01)
  *G06T 5/73* (2024.01)
  *G06T 7/00* (2017.01)
  *G06V 10/30* (2022.01)
  *H04L 25/02* (2006.01)
  *H04N 25/615* (2023.01)

(52) U.S. Cl.
  CPC .............. *G06F 17/13* (2013.01); *G06F 17/15* (2013.01); *G06T 5/10* (2013.01); *G06T 5/20* (2013.01); *G06T 5/70* (2024.01); *G06T 7/0012* (2013.01); *G06V 10/30* (2022.01); *H04L 25/025* (2013.01); *H04N 25/615* (2023.01); *G06T 2207/10056* (2013.01); *G06T 2207/10068* (2013.01); *G06T 2207/20056* (2013.01); *G06T 2207/20081* (2013.01); *G06T 2207/20084* (2013.01); *G06T 2207/20182* (2013.01); *G06T 2207/30024* (2013.01)

(56) References Cited

OTHER PUBLICATIONS

Idier, J., "Convex Half-Quadratic Criteria and Interacting Variables for Image Restoration," Jul. 2001, IEEE Transactions on Image Processing, 10(7), p. 1001-1009, IEEE, US.

Mazet, V., Carteret, C., Bire, D, Idier, J., and Humbert, B., "Background Removal from Spectra by Designing and Minimizing a Non-Quadratic Cost Function," Chemometrics and Intelligent Laboratory Systems, Elsevier Science Publishers B.V., Amsterdam, NL, vol. 76, No. 2, Apr. 28, 2005 (Apr. 28, 2005), pp. 121-133, XP025287580.

Michael Delles et al., "Quadratic phase offset error correction of velocity-encoded magnetic resonance imaging data", International Journal of Computer Assisted Radiology and Surgery, vol. 4, No. Suppl 1. May 7, 2009 (May 7, 2009), pp. S10-S11, XP055168335, Springer, Germany.

Peter G. Walker et al., "Semiautomated Method for Noise Reduction and Background Phase Error Correction in MR Phase Velocity Data", Journal of Magnetic Resonance Imaging, vol. 3, No. 3, May 1, 1993 (May 1, 1993), pp. 521-530, XP055013215, ISMRM, US.

wikipedia.org, "Curve fitting," May 5, 2018 (May 5, 2018), pp. 1-7, XP093226716, San Francisco, CA, USA Retrieved from the Internet: URL: https.//en.wikipedia.org/w/index.php?title=Curve fitting &oldid=839781899.

IMAGE PROCESSING APPARATUS AND METHOD FOR ENHANCING A PHASE DISTRIBUTION

CROSS REFERENCE TO RELATED APPLICATIONS

This application is a U.S. National Phase application under 35 U.S.C. § 371 of International Application No. PCT/EP2020/067096, filed on Jun. 19, 2020, and claims benefit to European Patent Application No. EP 19181836.8, filed on Jun. 21, 2019. The International Application was published in English on Dec. 24, 2020, as WO 2020/254574 A1 under PCT Article 21(2).

FIELD

The invention relates to an image processing apparatus and method for enhancing a digital input phase distribution.

BACKGROUND

Highly translucent objects are difficult to investigate optically, e.g. by an observation device, such as a microscope. As only very small amounts of light are absorbed and/or scattered, the contrast in a bright-field image of a highly translucent object is very small. Thus, instead of using light intensity, the phase shift that is imparted on the light traversing the highly translucent object is used for an optical investigation. The phase shift at different locations or pixels of an image is represented by the phase distribution.

Some methods for making phase shifts visible, such as phase contrast and differential interference contrast do not work with well plates. Moreover, post-processing of phase shift images or phase distributions, such as cell counting or confluence measurements, require a segmentation of the recorded images, which is difficult to perform on differential interference contrast, phase contrast or modulation contrast images.

Further, an interference-based generation of phase distributions requires expensive hardware such as coherent light sources and a careful separation and joining of optical paths, which prevents a ready integration into existing optical observation devices, such as microscopes.

Quantitative phase imaging based on differential phase contrast or a reconstruction from defocused images requires knowledge of a phase transfer function, in particular of the optical imaging system which is used for recording the input images from which the phase contrast is derived. As the phase transfer function is zero at frequency zero, low-frequency artifacts or noise are introduced by compensating for the phase transfer function. In the past, it was tried to compensate these errors by changing the illumination of the object, e.g. by using an annular illumination. This, however, leads to longer exposure times and is not usable for well plates.

SUMMARY

In an embodiment, the present disclosure provides an apparatus for enhancing an input phase distribution ($I(x_i)$). The apparatus is configured to retrieve the input phase distribution ($I(x_i)$), compute a baseline estimate ($f(x_i)$) as an estimate of a baseline ($I_2(x_i)$) in the input phase distribution ($I(x_i)$), and obtain an output phase distribution ($O(x_i)$) based on the baseline estimate ($f(x_i)$) and the input phase distribution ($I(x_i)$).

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
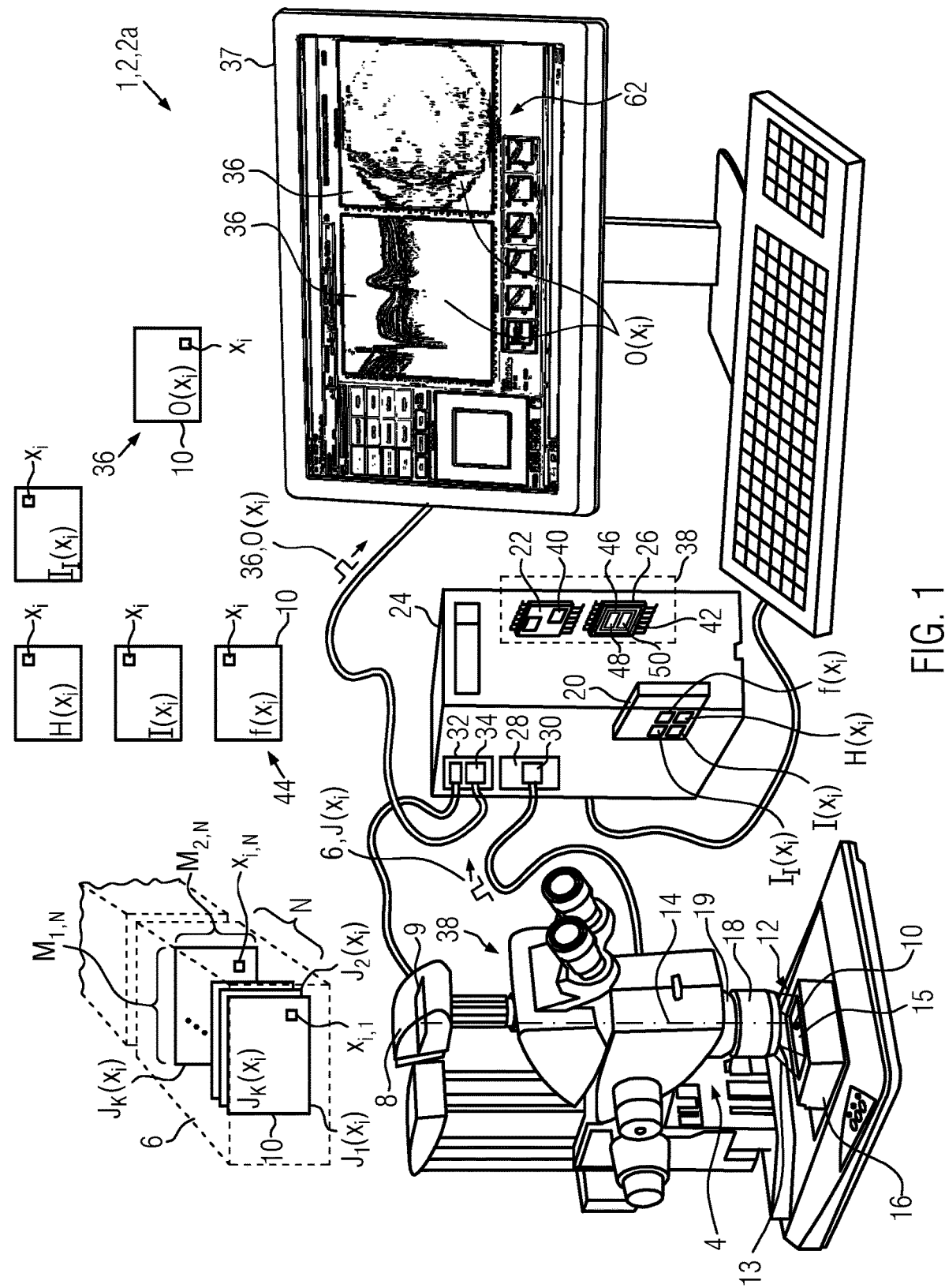
FIG. 1 shows a schematic representation of an embodiment of an apparatus for baseline removal in an input phase distribution.

Embodiments of the present invention provide an apparatus and a method, which are capable of reconstructing a phase distribution quickly and reliably, i.e. with as few artifacts as possible.

In an embodiment, the capability of reconstructing a phase distribution quickly and reliably is provided for by an apparatus for noise reduction in an input phase distribution, wherein the apparatus is configured to retrieve the input phase distribution and to compute a baseline estimate as an estimate of a baseline in the input phase distribution; and wherein the apparatus is further configured to obtain an output phase distribution based on the baseline estimate and the input phase distribution.

In another embodiment, the capability of reconstructing a phase distribution quickly and reliably is provided for by a method for noise reduction or estimating a baseline in an input phase distribution, the method comprising the steps of retrieving the input phase distribution; estimating a baseline in the input phase distribution to obtain a baseline estimate and obtaining an output phase distribution from the baseline estimate and the input phase distribution.

In a further embodiments, the capability of reconstructing a phase distribution quickly and reliably is provided for by a non-transitory computer readable medium storing a program causing a computer to execute the method according to an embodiment; by a computer program with a program code for performing the method according to an embodiment, when the computer program is run on a processor; by an output phase distribution being the result of executing the method according to an embodiment; and/or by a neural network device trained by input phase distributions and output phase distributions, where the output phase distributions are created from the input phase distribution data by the method according to an embodiment.

According to embodiments of the apparatus and method, a baseline of the input phase distribution is estimated. The baseline represents the component of the input phase distribution that has low spatial frequency and large spatial structures. By estimating the baseline, the artifacts of low spatial frequency that are introduced by the zeroes of the phase transfer function are estimated. Thus, the baseline estimate can be used to obtain an output phase distribution having less noise, e.g. by removing, in particular subtracting, the baseline estimate from the input phase distribution.

The input phase distribution is preferably an N-dimensional digital array $I(x_i)$, where N is an integer larger than 1 and $x_1$ to $x_N$ designate the dimensions or coordinates of the array. For a digital array, $x_i$ are integers. In particular, the input phase distribution may be a two dimensional real-valued array, represented digitally e.g. by an array of floating point numbers. The term "spatial" refers to the dimensions of the array.

The term $x_i$ is a shortcut notation for a tuple $\{x_1; \ldots; x_N\}$ containing N location values and representing a discrete location $x_i$—or the position vector to that location—in the array. A location $x_i$ may be represented by a pixel or a preferably coherent set of pixels in the input phase distribution data. The discrete location $x_i$ denotes e.g. a pair of discrete location variables $\{x_1; x_2\}$ in the case of two-dimensional input phase distribution data and a triplet of discrete location variables $\{x_1; x_2; x_3\}$ in the case of three-dimensional input phase distribution data. In the i-th dimension, the array may contain $M_i$ locations, i.e. $x_i = \{x_{i,1}, \ldots x_{i,M_i}\}$. In total, $I(x_i)$ may contain $(M_1 \times \ldots \times M_N)$ elements. As, in the following, no reference will be made to a concrete location or a concrete dimension, the location is indicated simply by $x_i$.

Other embodiments of the above apparatus and method may be further improved by adding one or more of the features that are described in the following. Each of the following features may be added to the method and/or the apparatus of various embodiments of the invention independently of the other features. In particular, a person skilled in the art is capable to configure the method according to embodiments of the invention such that the method is capable to operate the apparatus according to embodiments of the invention. Moreover, each feature has its own advantageous technical effect, as is explained hereinafter.

Embodiments of the apparatus and method start from the assumption that the noise contribution in the input phase distribution, due to its low spatial frequency, leads to predominantly gradual changes that extend over larger areas of the input phase distribution array. Starting from this assumption, the changes across the input phase distribution may be in one embodiment separated additively into a high spatial frequency content component $I_1(x_i)$ and a low spatial frequency noise component $I_2(x_i)$ as:

$$I(x_i) = I_1(x_i) + I_2(x_i)$$

The content component corresponds to the (unknown) phase distribution without the (additive) large-structure artifacts. Due to its low spatial frequency, the noise component $I_2(x_i)$ can be considered as a more or less smooth baseline of the input phase distribution on which the content component is superimposed as features having high spatial frequency.

Once the baseline estimate has been determined and thus a baseline estimate $f(x_i)$ for $I_2(x_i)$ has been obtained, e.g. as a digital array of discrete values, the output phase distribution $O(x_i)$ may be obtained from the baseline estimate and the input phase distribution. In particular, the output phase distribution may be computed by subtracting the baseline estimate from the input phase distribution:

$$O(x_i) = I(x_i) - f(x_i)$$

The output phase distribution $O(x_i)$ is preferably also represented by a discrete digital data array having dimension N and $M_1 \times \ldots \times M_N$ elements and thus has preferably the same dimensionality as the input phase distribution and/or the baseline estimate.

Preferably, the baseline estimate is computed using a fit to the input phase distribution. In one particular instance, the fit may be a polynomial fit to the input phase distribution. In particular, the baseline estimate may be represented by a K-order polynomial in any of the N dimensions i:

$$f(x_i) = \sum_{k=0}^{K} a_{i,k} x_i^k = a_{i,0} + a_{i,1} x_i^1 + a_{i,2} x_i^2 + \ldots + a_{i,K} x_i^K$$

where $a_{i,k}$ are the coefficients of the polynomial in the i-th dimension. For each dimension $i = 1, \ldots, N$, a separate polynomial may be computed. According to one embodiment, the polynomial fit may be done simultaneously in a plurality of dimensions, depending on the dimensions of the input phase distribution.

The optimum value for the maximum polynomial order K depends on the required smoothness of the baseline estimate. For a smooth baseline, the polynomial order must be set as low as possible, whereas fitting a highly irregular background may require a higher order.

In the case of a polynomial fit, the baseline estimate may consist only of the polynomial coefficients $a_{i,k}$. However, a polynomial fit might be difficult to control and not be precise because the only parameter that allows adjustment to the input phase distribution data is the maximum polynomial order. The polynomial order can only take integer values. It might therefore not always be possible to find an optimum baseline estimate. A non-optimum polynomial fit may exhibit local minima in the baseline estimate, which might lead to annoying artifacts.

Therefore, according to another advantageous embodiment, the fit to the input phase distribution data may be a spline fit, in particular a smoothing spline fit. A spline fit usually delivers more reliable results than a polynomial fit because it is simpler to control, e.g. in terms of smoothness, more robust to noise and creates less artifacts. On the other hand, the spline fit is computationally more complex than the polynomial fit because each pixel or, more generally, input phase distribution data must be varied for minimizing the least-square minimization criterion.

In order to ensure that the baseline estimate is an accurate representation of the noise or baseline contributions in the input phase distribution data and to avoid that the baseline estimate is fitted to the content contributions, a least-square minimization criterion may be used.

The least-square minimization criterion may comprise a penalty term. The penalty term is used to penalize any unwanted behavior of the baseline estimate, such as representing components of the input phase distribution data which have high spatial frequency content and/or represent small-scale structures and therefore belong to the content component.

According to one embodiment, the least-square minimization criterion $M(f(x_i))$ may have the following form:

$$M(f(x_i))=C(f(x_i))+P(f(x_i))$$

where $C(f(x_i))$ is a cost function and $P(f(x_i))$ is the penalty term. The least-square minimization criterion, the cost function and the penalty term are preferably scalar values.

In one particular instance, the cost function may reflect the difference between the input phase distribution $I(x_i)$ and the baseline estimate $f(x_i)$. For example, if $\varepsilon(x_i)$ denotes the difference term between the input phase distribution and the baseline estimate as:

$$\varepsilon(x_i)=I(x_i)-f(x_i)$$

the cost function $C(f(x_i))$ may comprise the $L_2$-norm $\|\varepsilon(x_i)\|^2$, which is used here as a short hand notation of the sum of the root-mean-square values across all dimensions of the sum of squared differences between the input phase distribution and the baseline estimate in the i-th dimension, i.e., as:

$$\|\varepsilon(x_i)\|^2 = \sum_{i=1}^{N}\sum_{m=1}^{M_i}(I(x_{i,m})-f(x_{i,m}))^2$$

The $L_2$-norm $\|\varepsilon(x_i)\|^2$ is a scalar value. An example of a cost function is:

$$C(f(x_i))=\|\varepsilon(x_i)\|^2$$

For computing the baseline estimate of the phase input distribution, it is preferred to have a symmetric difference term, so that the representation of both negative and positive small-structure deviations from the baseline leads to an increase of the cost function.

For improving the accuracy of the baseline estimate, it may be of advantage if the difference between the input phase distribution and the baseline estimate is truncated, e.g. by using a truncated difference term. A truncated difference term reduces the effects of peaks in the input phase distribution on the baseline estimate. Such a reduction is beneficial if the content component is assumed to comprise the peaks of $I(x_j)$. Due to the truncated difference term, peaks in the input phase distribution that deviate from the baseline estimate more than a predetermined constant threshold value s will have less weight in the cost function by truncating their penalty on the fit, in particular the spline fit, to the threshold value. Thus, the baseline estimate will follow such peaks only to a limited amount.

The truncated difference term is denoted by $\varphi(\varepsilon(x_j))$ in the following. As an example, the symmetric truncated quadratic term may have the following form:

$$\varphi(\varepsilon(x_i)) = \begin{cases} \varepsilon(x_i)^2 & \text{if } |\varepsilon(x_i)| \le s \\ s^2 & \text{else} \end{cases}$$

Here, s represents the value of the truncation, i.e. the threshold value. Of course, $\varphi(\varepsilon(x_i))$ may, in other embodiments, assume other values than $s^2$ for $|\varepsilon(x_i)|>s$.

Using a truncated quadratic term, the cost function $C(f(x_i))$ preferably may be expressed as:

$$C(f(x_i))=\sum_{i=1}^{N}\sum_{m=1}^{M_i}\varphi(x_{i,m})$$

The penalty term $P(f(x_i))$ in the least-square minimization criterion $M(f(x_i))$ may take any form that introduces a penalty if the baseline estimate is fitted to data that are considered to belong to the content component $I_1(x_i)$. A penalty is created in that the penalty term increases in value if the content component in the input phase distribution is represented in the baseline estimate.

If e.g. one assumes that the noise component $I_2(x_i)$ is considered to have low spatial frequency, the penalty term may comprise a term that becomes large if the spatial frequency of the baseline estimate becomes small.

Such a penalty term may be in one embodiment a roughness penalty term which penalizes non-smooth baseline estimate that deviate from a smooth baseline and thus effectively penalizes the fitting of data having high spatial frequency.

According to another aspect, a deviation from a smooth baseline may lead to large values in at least one of the first derivative, i.e. the steepness or gradient, and the second derivative, i.e. the curvature, of the baseline estimate. Therefore, the roughness penalty term may contain at least one of a first spatial derivative of the baseline estimate, in particular the square and/or absolute value of the first spatial derivative, and a second derivative of the baseline estimate, in particular the square and/or absolute value of the second spatial derivative. More generally, the penalty term may contain a spatial derivative of any arbitrary order of the baseline estimate, or any linear combination of spatial derivatives of the baseline estimate. Different penalty terms may be used in different dimensions.

In one embodiment, the penalty term $P(f(x_i))$ may comprise a dimensionless combination, e.g. quotient, of a derivative of the baseline estimate $f(x_i)$ with regard to its variable and a feature length $fl$. Different feature lengths may be used for different dimensions For example, the roughness penalty term $P(f(x_i))$ may be formed as:

$$P(f(x_i)) = \sum_{j=1}^{N}\gamma_j\sum_{i=1}^{N}\sum_{m=1}^{M_i}(\partial_j^2 f(x_{i,m}))^2$$

Herein, $\gamma_j$ is a regularization parameter and $\partial_j$ is a discrete operator for computing the second derivative in the j-th dimension. This roughness penalty term penalizes a large rate of change in the gradient of the baseline estimate or, equivalently, a high curvature, and thus favors smooth estimates.

The regularization parameter $\gamma_j$ is set depending on the spatial structure of the input phase distribution. It represents the maximum length scale that is considered to be part of the content component. Structures in the input phase distribution having a length scale that is larger than the feature scale $fl_j$ are considered as belonging to the noise component. The regularization parameter may be predetermined by a user and is preferably larger than zero.

As the unit of the second derivative is (unit of $x_i)^{-2}$, i.e. length$^{-2}$ or time$^{-2}$, $\gamma_j$ is set to the fourth power of the feature length, $\gamma_j=fl_j^4$, so that the penalty term is scalar.

In a penalty term, which is based on the first-order derivative $\partial_j$, such as:

$$P(f(x_i)) = \sum_{j=1}^{N} \gamma_j \sum_{i=1}^{N} \sum_{m=1}^{M_i} (\partial_j f(x_{i,m}))^2$$

the regularization parameter $\gamma_j$ may be equal to the square of the feature length, $\gamma_j = fl_j^2$, as the unit of the first-order derivative is (unit of $x_i$)$^{-1}$.

For a combination of various derivatives, such as:

$$P(f(x_i)) = \sum_{j=1}^{N} \gamma_{1,j} \sum_{i=1}^{N} \sum_{m=1}^{M_i} (\partial_j^2 f(x_{i,m}))^2 + \sum_{j=1}^{N} \gamma_{2,j} \sum_{i=1}^{N} \sum_{m=1}^{M_i} (\partial_j f(x_{i,m}))^2$$

each of the regularization parameter is set in dependence of the respective derivative. In the above example, $\gamma_{1,j} = fl_j^4$, and $\gamma_{2,j} = fl_j^2$.

In a combined derivative, such as $\partial_i \partial_j f(x_{i,j})$, $i \neq j$, a corresponding combination of feature lengths, e.g. $fl_i \cdot fl_j$ may be used.

In the discrete, the differentiation may be computed efficiently using a convolution. For example:

$$\partial_j^2 f(x_{i,m}) = D_{i,m}^{(j)} * f(x_{i,m})$$

with a second order derivative matrix:

$$D_{i,m}^{(j)} = \begin{cases} 1 & \text{if } m = 1 \text{ or } M_j, \text{ and } i = j \\ -2 & \text{if } m = 0 \text{ and } i = j \\ 0 & \text{else} \end{cases}$$

It is preferred, however, that the roughness penalty term $P(f(x_i))$ is formed as:

$$P(f(x_i)) = \sum_{j=1}^{N} \gamma_j \sum_{i=1}^{N} \sum_{m=1}^{M_i} (\partial_j f(x_{i,m}))^2$$

This is a roughness penalty term that penalizes small-scale features and large gradients in the baseline estimate. The sum over j allows to use different penalty terms and regularization parameters in different dimensions. It should be noted that, as $x_j$ and $f(x_i)$ are both discrete, the differentiation can be carried out by convolution with a derivative array $\partial_j$. The operator $\partial_j$ represents a discrete first-order derivative or gradient operator in the dimension j, which may be represented by an array.

Instead of or in addition to a derivative or a linear combination of derivatives of the baseline estimate, the penalty term may contain a feature-extracting, in particular linear, filter or a linear combination of such filters. Feature-extracting filters may be a Sobel filter, a Laplace filter, and/or a FIR filter, e.g. a high-pass or band-pass spatial filter having a pass-band for high spatial frequencies.

In such general formulation, the penalty term for the j-th dimension may contain general operators $\zeta^{(j)}$ and be expressed as:

$$P(f(x_i)) = \sum_{j=1}^{N} \gamma_j \sum_{i=1}^{N} \sum_{m=1}^{M_i} [\zeta^{(j)}(f(x_{i,m}))]^2$$

The least-square minimization criterion $M(f(x_i))$ may be minimized using known methods. In one instance, a preferably iterative minimization scheme may be used for computing the minimization criterion. For performing the minimization, the baseline estimator engine may comprise a minimization engine. The minimization may comprise an iteration mechanism having two iteration stages.

The minimization scheme may e.g. comprise at least part of the LEGEND algorithm, which is computationally efficient. The LEGEND algorithm is described in Idier, J. (2001): *Convex Half-Quadratic Criteria and Interacting Variables for Image Restoration*, IEEE Transactions on Image Processing, 10(7), p. 1001-1009, and in Mazet, V., Carteret, C., Bire, D, Idier, J., and Humbert, B. (2005): *Background Removal from Spectra by Designing and Minimizing a Non-Quadratic Cost Function*, Chemometrics and Intelligent Laboratory Systems, 76, p. 121-133. Both articles are herewith incorporated by reference in their entirety.

The LEGEND algorithm introduces discrete auxiliary data $d_l(x_i)$ that are preferably of the same dimensionality as the input phase distribution data. The auxiliary data are updated at each iteration depending on the latest initial baseline estimate, the truncated quadratic term and the input phase distribution data.

In the LEGEND algorithm, the least-square minimization criterion containing only a cost function and no penalty term is minimized using two iterative steps until a convergence criterion is met.

A suitable convergence criterion may, for example, be that the sum of the differences between the current baseline estimate and the previous baseline estimate across all locations $x_i$ is smaller than a predetermined threshold.

In a further improvement, the convergence criterion may be expressed as:

$$\frac{\sum_{k=0}^{N} \sum_{m=0}^{M_i} |f_l(x_{i,m}) - f_{l-1}(x_{i,m})|}{\sum_{k=0}^{N} \sum_{m=0}^{M_i} (f_l(x_{i,m}) + f_{l-1}(x_{i,m}))} < t$$

where t is a scalar convergence value which may be set by the user.

As a starting step in the LEGEND algorithm, an initial set of baseline estimates is defined.

The LEGEND algorithm may be started by selecting a starting set of coefficients $a_k$ for a first baseline estimate $f_0(x_i) = \sum_{k=0}^{K} a_{i,k} x_i^k$ for each of the i=1, ..., N polynomials if a polynomial fit is used.

If a spline fit is used, the initial condition for starting the LEGEND algorithm may be $d_l(x_i) = 0$, $f(x_i) = I(x_i)$ and the iteration is started by entering at the second iterative step.

In the first iterative step, the auxiliary data may be updated as follows:

$$d_l(x_i) = \begin{cases} (2\beta - 1)(I(x_i) - f_{l-1}(x_i)) & \text{if } \varepsilon(x_i) \leq s \\ -I(x_i) + f_{l-1}(x_i) & \text{else} \end{cases}$$

where l=1 ... L is the index of the current iteration and $\beta$ is a constant that may be chosen. Preferably, $\beta$ is close but not equal to 0.5. A suitable value of $\beta$ is 0.493.

In a second iterative step, the baseline estimate $f_l(x_i)$ is updated based on the previously calculated auxiliary data $d_l(x_i)$, the baseline estimate $f_{l-1}(x_i)$ from the previous iteration l-1 and on the penalty term POO.

The baseline estimate $f_l(x_i)$ may be minimizing a minimization criterion M ($f(x_i)$) which has been modified for the LEGEND algorithm by including the auxiliary data.

In particular, the updated baseline estimate may be computed using the following formula in the second iterative LEGEND step:

$$f_l(x_i) = \underset{f}{\mathrm{argmin}}\left[\|I(x_i) - f_{l-1}(x_i) + d_l(x_i)\|^2 + P(f(x_i))\right]$$

Here, $[\|I(x_i)-f_{l-1}(x_i)+d_l(x_i)\|^2+P(f(x_i))]$ represents the modified minimization criterion.

The second iterative step may update the baseline estimate using the following matrix computation:

$$f_l(x_i) = (1 + \Sigma_{i=1}^N \gamma_i A_i^T A_i)^{-1}(I(x_i) + d_l(x_i)))$$

Here $(1+\Sigma_{i=1}^N \gamma_i A_i^T A_i)$ is a $(M_1 \times \ldots \times M_N)^2$ dimensional array. In the two-dimensional case, $A_i$ is a $(M_x-1)(M_y-1) \times M_x M_y$ array and given as:

$$A_i = \begin{pmatrix} \hat{A} & -\hat{A} & \hat{0} & \ldots & \hat{0} \\ \hat{0} & \hat{A} & -\hat{A} & \ddots & \vdots \\ \vdots & \ddots & \ddots & \ddots & \hat{0} \\ \hat{0} & \ldots & \hat{0} & \hat{A} & -\hat{A} \end{pmatrix}$$

with $$\hat{A} = \begin{pmatrix} 1 & -1 & 0 & \ldots & 0 \\ 0 & 1 & -1 & \ddots & \vdots \\ \vdots & \ddots & \ddots & \ddots & 0 \\ 0 & \ldots & 0 & 1 & -1 \end{pmatrix},$$

$$\hat{0} = \begin{pmatrix} 0 & 0 & 0 & \ldots & 0 \\ 0 & 0 & 0 & \ddots & \vdots \\ \vdots & \ddots & \ddots & \ddots & 0 \\ 0 & \ldots & 0 & 0 & 0 \end{pmatrix} \in \mathbb{R}^{(M_x-1) \times M_x}$$

The two iteration steps for updating $d_l(x_i)$ and $f_l(x_i)$ are repeated until the convergence criterion is met.

According to another aspect, the second step of the LEGEND algorithm is modified using a convolution instead of a matrix computation. This greatly reduces the computational effort.

More particularly, it is preferred that the updated baseline estimate $f_l(x_i)$ is computed directly by convolving a Green's function with the sum of the input phase distribution and the updated auxiliary data.

According to a more concrete aspect, the second iterative step of the LEGEND algorithm may be replaced by the following iterative step, where the updated baseline estimate $f_l(x_i)$ is computed in the l-th iteration using a Green's function $G(x_i)$ as follows:

$$f_l(x_i) = G(x_i) * I(x_i) + d_l(x_i))$$

This step reduces the computational burden significantly as compared to the traditional LEGEND algorithm.

The reduced computational burden results from the fact that according to the above second iterative step, a convolution is computed. This computation can be efficiently carried out using an FFT algorithm. Moreover, the second iterative step may make full use of an array processor, such as a graphics processing unit or an FPGA due to the FFT algorithm. The computational problem is reduced from $(M_x \times M_y)^2$ to $M_x \times M_y$ if the input phase distribution data and all other arrays are two-dimensional. For a general N-dimensional case, the computational burden is reduced from $(M_1 \times \ldots \times M_N)^2$ dimensional matrix calculations to the computation of a FFT with $(M_1 \times \ldots \times M_N)$-dimensional arrays.

Thus, the baseline estimation may be carried out very quickly, preferably in real time for two-dimensional input phase distribution data. A (2 k×2 k) image data array, here an image, may be processed in 50 ms and less.

In one specific embodiment, the Green's function may have the form:

$$G(x_{i,m}) = \mathcal{F}^{-1}\left[\frac{1}{1 - \sum_{j=1}^N \gamma_j \mathcal{F}\left[D_{i,m}^{(j)}\right]}\right]$$

where $\mathcal{F}[\ldots]$ is the discrete N-dimensional Fourier transform, $\mathcal{F}^{-1}[\ldots]$ is the inverse discrete N-dimensional Fourier transform, $\gamma_i$ is the regularization parameter of the roughness penalty term, $D_{i,m}^{(j)}$ is a discrete penalty array in the i-th dimension at location m, and N is the total number of dimensions. The upper index $D^{(j)}$ indicates that there may be a different penalty array for each dimension j.

In general, the discrete penalty array $D_{i,m}^{(j)}$ corresponds to the discrete representation of the functional derivative $$\frac{\delta P^{(j)}(f(x_i))}{\delta f(x_{i,m})}$$

of the penalty term $P^{(j)}(f(x_i))$ that is used for the j-th dimension. As all functions are represented by discrete arrays, the differentiation can be carried out numerically by a convolution:

$$D_{i,m}^{(j)} * P^{(j)}(x_{i,m})$$

where $D_{i,m}^{(j)}$ is the discrete array for computing the functional derivative $$\frac{\delta}{\delta f(x_{i,m})}.$$

A big advantage of the above Green's function is that any form of penalty term $P(f(x_i))$ may benefit from the fast computation of the second iterative step in the minimization engine. Thus, in the embodiment which uses the Green's function, any penalty term for obtaining a good baseline estimate may be used.

For the general formulation of the penalty term:

$$P(f(x_i)) = \sum_{j=1}^N \gamma_j \sum_{i=1}^N \sum_{m=1}^{M_i} \left[\zeta^{(j)}(f(x_{i,m}))\right]^2$$

the array $D_{i,m}^{(j)}$ is defined by:

$$D_{i,m}^{(j)} * P(f(x_{i,m})) = 0.5 \nabla_f \sum_{j=1}^N \gamma_j \sum_{i=1}^N \sum_{m=1}^{M_i} \left[\zeta^{(j)}(f(x_{i,m}))\right]^2$$

where $\zeta^{(j)}$ is a general operator of the penalty term, * denotes the N-dimensional convolution and $\nabla_f$ corresponds to the discrete first-order functional derivative in function $f(x_{i,m})$, which may e.g. represent intensity. This equation can be solved by means of the least squares method.

For example, if the penalty term is:

$$P(f(x_i)) = \sum_{j=1}^{N} \gamma_j \sum_{i=1}^{N} \sum_{m=1}^{M_i} (\partial_j f(x_{i,m}))^2$$

the derivative array in the convolution may be expressed as:

$$D_{i,m}^{(j)} = \begin{cases} 2 & \text{if } m = 0 \text{ and } i = j \\ -1 & \text{if } m = 1 \text{ or } M_i, \text{ and } i = j \\ 0 & \text{else} \end{cases}$$

The output phase distribution $O(x_i)$ may in one embodiment already constitute an output image which is ready for further post-processing or for display. It may be needed, however, to convert the output phase distribution into an image format of a color or a monochrome image, e.g. by converting a real-valued phase distribution into an integer format within the value range of a respective standardized image format. The apparatus may comprise a display for displaying the output phase distribution.

According to another embodiment, the apparatus may be configured to retrieve two or more digital input images $J_k(x_i)$ and to retrieve a phase point spread function $H(x_i)$. Retrieving any of these two entities $J_k(x_i)$ and $H(x_i)$ comprises retrieving the entity in a format that allows to compute this entity. For example, instead of $H(x_i)$, its Fourier transform $\mathcal{F}(H(x_i))$, the phase transfer function, may be retrieved. The digital input images may e.g. be retrieved from a camera which is connected to or part of the apparatus. The digital images and the phase transfer function may also be stored on a storage section which may be connected to or be a part of the apparatus, and from which they may be retrieved. The apparatus may be configured to obtain the input phase distribution $I(x_i)$ from the at least two digital input images $J_k(x_i)$ and the phase transfer function. The two input images should not be identical but are preferably slightly different.

In particular, the apparatus may be configured to record the two or more input images using, for each of the two or more digital input images, one of a different focal length, a different illumination direction, a different distance of an objective lens from the probe volume and a different length of an optical path from an image sensor and/or detector to the probe volume.

The two or more input images may be bright field images, in particular monochrome bright field images. In one embodiment, an even number of input images is used, where the input images are recorded pairwise with equal changes, e.g. equal defocus or equal illumination asymmetry, in opposite direction. The apparatus may be configured to record the input images automatically pairwise with an equal change in opposite direction. An efficient artifact reduction in the output phase distribution may already be achieved if two input images are used for obtaining the phase distribution.

The objective lens and/or the image sensor/detector may be part of the apparatus.

To facilitate the recording of the two or more input images, the apparatus may comprise at least one of a controllable aperture in the rear focal plane; an illumination system which is configured to illuminate a probe volume either sequentially or simultaneously from at least two different directions, preferably asymmetrically; an imaging system comprising at least one imaging sensor and/or one camera, the imaging system being configured to record two or more digital input images, each of the two or more images being recorded at a different distance from the probe volume; and an objective having at least one of an optical axis and being movable relative to the probe volume along the optical axis, and a lens having variable focal length.

The apparatus and/or its sample volume may be configured to receive at least one well plate. The well plate could comprise one or more objects in one or more wells of the well plates.

The apparatus may further comprise an illumination system having a plurality of light sources, at least some of the light sources of the plurality of light sources being configured to be controlled independently from one another. In particular, the apparatus may be configured to automatically control the light sources to obtain a different, preferably asymmetrical illumination, for each of the two or more input images.

The illumination system may further be provided with a condenser. The light sources may be arranged in or at least close to the rear focal plane of the condenser. Alternatively or additionally, a variable aperture, iris or diaphragm may be arranged in or at least close to the rear focal plane of the condenser. The apparatus may be configured to control the variable aperture automatically, e.g. to set the aperture automatically into two different operating states for recording each of the input images. In each of the operating states, a different asymmetric illumination of the probe volume is generated.

For obtaining two or more input images that have a different defocus, one or more of the following embodiments of the apparatus may be used: the lens having a variable focal length may be arranged at the rear focal plane of the objective or at a plane conjugate to the focal plane; the image sensor/detector may be movable with respect to the sample volume into at least two positions, each position being located at a different distance from the sample volume; the apparatus may comprise two or more image sensors/detectors that are each arranged at different distances from the probe volume and are selectively used for recording an input image.

In one embodiment, an intermediate image $I_f(x_i)$ may be computed from the two or more digital input images $J_k(x_i)$, e.g. by subtracting the two or more input images from one another. Correspondingly, the apparatus in particular, its image processor, may be configured to subtract the two or more input images from one another.

For a thin, highly translucent object, such as an object on a well-plate, the Fourier transform $\mathcal{F}(I_f(x_i))$ of the intermediate image $I_f(x_i)$ is related to the Fourier transform $\mathcal{F}(I(x_i))$ of the phase distribution $I(x_i)$ and the Fourier transform $\mathcal{F}(H(x_i))$ of the phase point spread function $H(x_i)$ as follows:

$$\mathcal{F}(I_f(x_i)) = \mathcal{F}(H(x_i)) \cdot \mathcal{F}(I(x_i))$$

The phase transfer function is known, e.g. from experiments, numerical simulations and/or analytics, and may be retrieved e.g. from the storage section. As the phase transfer function is zero at zero frequence in the Fourier space, the above equation for $H(x_i)$ is preferably solved using a regularization method, such as minimizing the expression:

$$|\mathcal{F}(I_f(x_i)) - \mathcal{F}(H(x_i)) \cdot \mathcal{F}(I(x_i))|^2 + R$$

where R is a regularization function. For the regularization function R, a formulation as in a Tikhonov regularization may be used, such as, $R=\alpha |\mathcal{F}(I(x_i))|^2$, with $\alpha$ being the regularization parameter, which is preferably representative of the strength and/or the length scale of the noise in the intermediate image. The 'true' phase distribution is, overall, better matched with $\alpha$ being small. However, in this case, strong low-frequency (large-structure) artifacts are introduced. If a larger $\alpha$ is chosen, the low-frequency artifacts are smaller, but the overall representation of the phase distribution is not of high quality.

Applying a baseline removal as described above to the phase distribution $I(x_i)$ allows to solve the regularization for the phase distribution with a smaller value for a and thus obtain a very accurate representation of small spatial structures in the phase distribution. Artifacts in the large-scale, low spatial frequency structures can be tolerated as they can be represented in the baseline estimate $f(x_i)$ and removed from the input phase distribution. Thus, the phase distribution as computed by the above regularization, preferably with $\alpha$ being small, is used as an input phase distribution for the baseline estimation and removal.

For at least temporarily storing at least one of the digital input images, the intermediate image, the input phase distribution, the phase transfer function and the output phase distribution, the apparatus may comprise a storage section.

The apparatus may comprise an input section, which may comprise e.g. one or more standard connectors and/or one or more standardized data exchange protocols. The input section may be adapted to receive the input phase distribution and/or the two or more input images via the one or more standard connectors and/or one or more data exchange protocols. For example, a storage section and/or a camera may be connected to the image input section.

The apparatus may comprise an image output section comprising e.g. one or more standard connectors and/or one or more standardized data exchange protocols. The image output section may be adapted to output the output image via the one or more standard connectors and/or one or more data exchange protocols. For example, another computer, a network and/or a display may be connected to the image output section.

The apparatus may further comprise an image processor, which may be configured to perform the baseline estimate.

The image processor may comprise a deblurring section. The deblurring section may be adapted to subtract a baseline contribution, e.g. the baseline estimate from the input image to compute the output image.

The image processor may comprise a baseline estimator engine. The baseline estimator engine may be configured to compute the baseline estimate by a fit to at least a subset of the input image. The baseline estimator engine may comprise a discrete representation of the least-square minimization criterion $M(x_i)$.

The image processor may be configured to compute the intermediate image from at least two digital input images, e.g. to subtract two or more digital input images from one another. The apparatus may be configured to retrieve the intermediate image from the storage section if, for example, the intermediate image has been computed outside the apparatus.

The image processor may further comprise a regularization engine. The regularization engine may be configured to compute the input phase distribution based on the intermediate image and the phase transfer function, e.g. by minimizing a Tikhonov regularization comprising a regularization parameter $\alpha$ and/or a regularization function such as $\alpha |\mathcal{F}(I(x_i))|^2$, which is representative for the noise level and/or the length scale of the noise structures in the intermediate image.

The image processor, the baseline estimator engine, the deblurring section and the minimization engine may each be implemented in hardware, in software or as a combination or hardware and software. For example, at least one of the image processor, the baseline estimator engine, the deblurring section and the minimization engine may be at least partly be implemented by a subroutine, a section of a general-purpose processor, such as a CPU, and/or a dedicated processor such as a CPU, GPU, FPGA, vector processor and/or ASIC.

Another way of implementing an embodiment of the above method is to train an artificial neural network, e. g. a convolutional neural network, using pairs of input phase distribution data and output phase distribution data, where the output phase distribution data have been generated using an embodiment of the above described method. A neural network device which has been trained this way can be regarded as an implementation of the method which has been used to generate the training pairs of input and output phase distribution data.

The apparatus may be part of an observation device, such as a microscope. The input images need not to be recorded with a camera and need not to represent visible-light images. For example, the apparatus may be part of and/or the method may be carried out for two or more input images or an input phase distribution from an x-ray microscope, electron microscope, and/or a microscope using coherent light sources or non-coherent light sources.

Next, embodiments of the invention are further described by way of example only using a sample embodiment, which is also shown in the drawings. In the drawings, the same reference numerals are used for features which correspond to each other with respect to at least one of function and design.

The combination of features shown in the enclosed embodiment is for explanatory purposes only and can be modified. For example, a feature of the embodiment having a technical effect that is not needed for a specific application may be omitted. Likewise, a feature which is not shown to be part of the embodiment may be added if the technical effect associated with this feature is needed for a particular application.

As is clear from above, any type of image data may be used.

First, the structure of the apparatus 1 is explained with reference to FIG. 1. The apparatus 1 may be an observation device 2, such as an endoscope or a microscope 2a. Just for the purpose of explanation, a microscope 2a is shown as an example of an apparatus 1. The microscope 2a may be any type of microscope, such as a bright-field microscope, a SPIM microscope, a SCAPE microscope, a scanning microscope, or a confocal microscope.

The apparatus 1 may comprise an imaging system 4, which is adapted to capture input image data 6 representing an input image $J(x_i)$, e.g. with a camera 8, preferably in digital format. The camera 8 may comprise at least one image sensor and/or detector 9. More particularly, the camera 8 may be a monochrome, CCD, multispectral or hyperspectral camera, a photon counter, or a photo sensor. In the following, the input image $J(x_i)$ is considered as a monochrome image. However, the input image may represent a single color channel of a color image or represent the light intensity over all or a subset of the color channels of a color image.

Other types of input image data 6 may of course be recorded with devices or sensors other than a camera, e.g. one or more microphones, vibrational sensors, accelerometers, velocity sensors, antennas, pressure transducers, temperature sensors, capacitive sensors, magnetic sensors, by radiography, by tomography, by ultrasound and any combination thereof.

The input image data 6 may be a digital array representing a measured physical, quantity I, which depends of a location $x_i$ in the array. The term $x_i$ is a shortcut notation for a tuple $\{x_1; \ldots; x_N\}$ containing N dimensions. A location $x_i$ may be a pixel/voxel or a preferably coherent set of pixels/voxels in the input image data 6. The discrete location $x_i$ denotes e.g. the discrete location variables $\{x_1; x_2\}$ of a pixel in the case of two-dimensional input image data 6 and a triplet of discrete location variables $\{x_1; x_2; x_3\}$ of a voxel in the case of three-dimensional input image data. In the i-th dimension, the array may contain $M_i$ locations, i.e. $x_i = \{x_{i,1}, \ldots, x_{i,M_i}\}$. In total, $J(x_i)$ may contain $(M_1 \times \ldots \times M_N)$ elements in the case of N dimensions. An input image $J(x_i)$ which comprises more than one (color) channel, may be represented by an array of more than 2 dimensions, where one dimension is an index of the color channel. Alternatively, each channel may be viewed separately and regarded as a two-dimensional input image.

An object 10 is located in a probe volume 12 of the imaging system 4. The probe volume 12 is configured to receive the object 10 to be inspected by the apparatus 1. For this, the probe volume 12 is preferably located in a field of view 13 of the imaging system 4. An optical path 14 of the apparatus 1 or the imaging system 4, respectively, extends from the probe volume 12 to the at least one image sensor/detector 9.

The object 10 is preferably thin and highly translucent. It may be arranged on a well plate 15. The object 10 may comprise animate and/or inanimate matter.

Due to the high translucency of the object 10, the intensity variations in the input image $J(x_i)$ will not be high enough for an investigation of the object. Therefore, it is preferred to investigate the object 10 using the phase information, which represents differences in refraction across the object 10, rather than the intensity information, which represents differences in transmissivity across the object 10.

The apparatus 1 may comprise an illumination system 16 that is arranged opposite the imaging system 4 with respect to the probe volume 12. Light from the illumination system 16 is guided through the object 10 and—if present—the well plate 15 into the imaging system 4 which may also be part of the apparatus 1, along the optical path 14 to the image sensor/detector 9. The imaging system 4 may comprise an objective 18 and a tube lens 19.

The apparatus 1 may further comprise a storage section 20 which is adapted to contain, at least temporarily, the input image data 6. The storage section 20 may comprise a volatile or non-volatile memory, such as a cache memory of a CPU 22 of a computing device 24, such as a PC, and/or of a GPU 26. The storage section 20 may comprise RAM, a disk drive or an exchangeable storage device, such as a USB stick or an SD card. The storage section 20 may comprise any combination of these types of memory.

For acquiring the input phase distribution $(x_i)$, e.g. from the camera 8, an image input section 28 may be provided. The image input section 28 may comprise a standardized input connection device 30, such as standardized data exchange protocols, hardware connectors and/or wireless connections, or any combination thereof. Examples of a standardized input connection device 30, to which the camera 8 may be connected are HDMI, USB and RJ45 connectors.

The apparatus 1 may further comprise an image output section 32 which may comprise a standardized output connection device 34, such as standardized data exchange protocols, hardware connectors and/or wireless connections, or any combination thereof, each configured to output output phase distribution data 36 to one or more displays 37. The output phase distribution data 36 are preferably represented by a discrete array of discrete values, representing an output phase distribution $O(x_i)$ as described in the following.

For computing an output phase distribution $O(x_i)$ from the input image data 6, an image processor 38 may be provided. The image processor 38 and its constituents may be at least partly hardware, at least partly software and/or a combination of both hardware and software. For example, the image processor 38 may comprise at least one of a CPU 22 and a GPU 26 of the computing device 24, as well as sections that have been coded in software and temporarily exist as structural entities in the CPU 22 and/or the GPU 26 as an operational state. The image processor 38 may also comprise additional hardware such as one or more ASICs and/or FPGAs, which have been specifically designed in carrying out operations required for the apparatus and method according to embodiments of the invention.

The apparatus 1 may be configured to obtain a plurality of K different input images $J_{1 \ldots K}(x_i)$. For example, the camera 8 may record—preferably automatically—two input images $H_1(x_i)$ and $J_2(x_i)$, where at least one of the illumination, exposure and focus has been changed, again preferably automatically, between the recording.

The apparatus 1, in particular the image processor 38, may be further configured to obtain an input phase distribution $I(x_i)$ from the plurality of input images $J_k(x_i)$ and a phase point spread function $H(x_i)$. The phase point spread function $H(x_i)$, or, equivalently, its Fourier transform $\mathcal{F}(H(x_i))$, the phase transfer function, may be stored in the storage section 20.

For obtaining the input phase distribution $I(x_i)$, the apparatus 1, in particular the image processor 38, may be configured to compute an intermediate image $I_f(x_i)$ from at least two digital input images $J_k(x_i)$, e.g. to subtract two or more digital input images from one another. In the simplest case, $I_f(x_i) = J_1(x_i) - J_2(x_i)$. Alternatively or cumulatively, the apparatus 1 may be configured to retrieve the intermediate image $I_f(x_i)$ from the storage section 20 if, for example, the intermediate image $I_f(x_i)$ has been computed outside the apparatus 1.

The apparatus 1, in particular the image processor 38, may further comprise a regularization engine 40, which may be a hardware section, a software section or a combination of a hardware and a software section of the image processor 38.

The regularization engine 40 may be configured to compute the input phase distribution $I(x_i)$ based on the intermediate image $I_f(x_i)$ and the phase point spread function $H(x_i)$, e.g. by minimizing the following regularization function:

$$|\mathcal{F}_{I_f(x_i)} - \mathcal{F}_{(H(x_i))} \cdot \mathcal{F}_{(I(x_i))}|^2 + \alpha |\mathcal{F}_{(I(x_i))}|^2$$

over $I(x_i)$, where $\alpha$ is a regularization parameter, which is representative for the noise level and/or the length scale of the noise structures in the intermediate image $I_f(x_i)$. For computing the input phase distribution $I(x_i)$, $\alpha$ is set to a value determined by the user or pre-determined based on the measured noise structures. Typically, α takes on values in the range of $10^{-10}$ to $10^{-6}$. Using a value for α in this range typically leads to an accurate representation of the phase distribution $I(x_i)$ for high spatial frequencies but introduces artifacts at the low frequencies.

In the following, it is described how these artifacts may be removed from the phase distribution $I(x_i)$, so that an accurate representation is obtained also for the low frequencies.

Alternatively or cumulatively, the apparatus 1 may be configured to retrieve the input phase distribution $I(x_i)$ from the storage section 20, if input phase information has been computed outside the apparatus 1. The retrieved input phase information preferably has been computed by performing a regularization on a difference of two or more bright field images $J_k(x_i)$ and/or contains a noise component of predominantly low (spatial) frequency.

The input phase distribution $I(x_i)$ is assumed to be composed additively from a content component $I_1(x_i)$, which represents an estimate for an output phase distribution $O(x_i)$, which is improved over the input phase distribution $I(x_i)$, and a noise component $I_2(x_i)$, which contains artifacts and noise that are not part of the true image. Neither $I_1(x_i)$ nor $I_2(X_i)$ are known and therefore have to be estimated.

Figure 11:
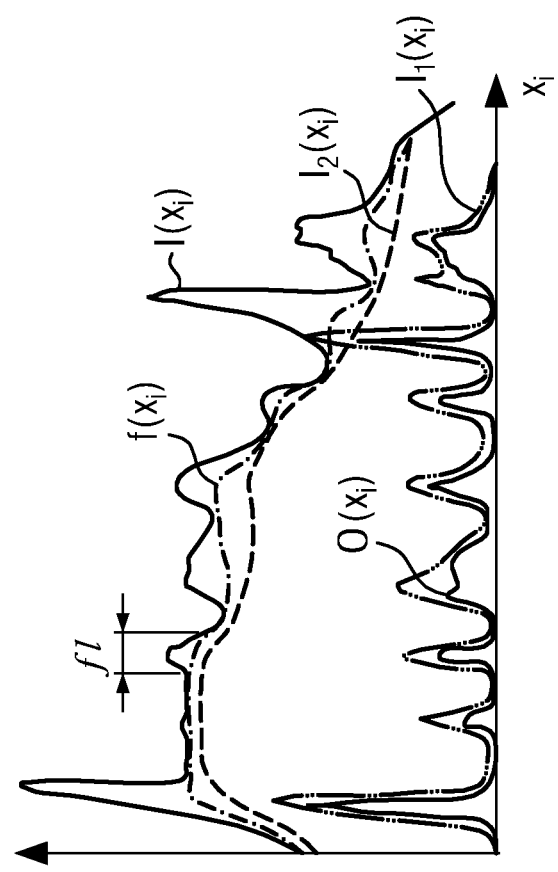
FIG. 11 shows a schematic representation of an input and an output phase distribution together with the noise component (baseline estimate) and the content component.

For computing the output phase distribution $O(x_i)$, it may be assumed that the noise component $I_2(X_i)$ consists of or comprises predominantly components having low spatial frequency. The noise component $I_2(X_i)$ thus represents a smooth baseline, about which the content component $I_1(x_i)$ fluctuates at a higher spatial frequency. The content component $I_1(x_i)$ is, by contrast, assumed not to be smooth and to contain at least one of peaks and valleys, and to be composed of structures or features having a smaller length scale than the noise component $I_2(x_i)$. Subtracting the noise component $I_2(x_i)$, i.e. the baseline, reduces noise and lets the structures of the content component $I_1(x_i)$ emerge more clearly, as schematically shown in FIG. 11. As the output phase distribution $O(x_i)$ may be displayed as an image, removal of the noise component $I_2(X_i)$ makes the structures of the object 10 more visible.

For the noise reduction, an estimate for the noise component $I_2(x_i)$ is computed. This estimate is represented by a baseline estimate $f(x_i)$. The baseline estimate $f(x_i)$ is a discrete digital array that has preferably the same dimensionality as the input phase distribution $I(x_i)$ and/or the output phase distribution data 36. The baseline estimate $f(x_i)$ is represented by baseline estimation data 44 in FIG. 1. The baseline estimate $f(x_i)$ may also be at least temporarily stored in storage section 20. Once the baseline estimate $f(x_i)$ has been computed, the output phase distribution $O(x_i)$ is obtained by subtracting the baseline estimate $f(x_i)$ from the input phase distribution $I(x_i)$ at each location $x_i$.

According to FIG. 1, the image processor 38 may comprise a baseline estimator engine 42, which is configured to compute the baseline estimate $f(x_i)$ by a fit to at least a subset of the input phase distribution data $I(x_i)$. Preferably, the fit to at least the subset of the input phase distribution data is a spline fit.

For a computationally efficient spline fit, the baseline estimator engine 42 may comprise a minimization engine 46, which may, for example, be a subroutine or a combination of a hard-wired algorithm and a matching software. The minimization engine 46 may be configured to execute a minimization scheme and, towards this end, may comprise two iteration stages 48, 50.

According to an embodiment of the invention, the minimization engine 46 uses a convolution to compute the baseline estimate 44 in the second iteration stage 50. As the convolution can be computed more efficiently on an array processor using a FFT, it is preferred that the image processor 38 includes an array processor such as a GPU 26. In operation, the image processor 30 comprises the minimization engine 46.

Figure 2:
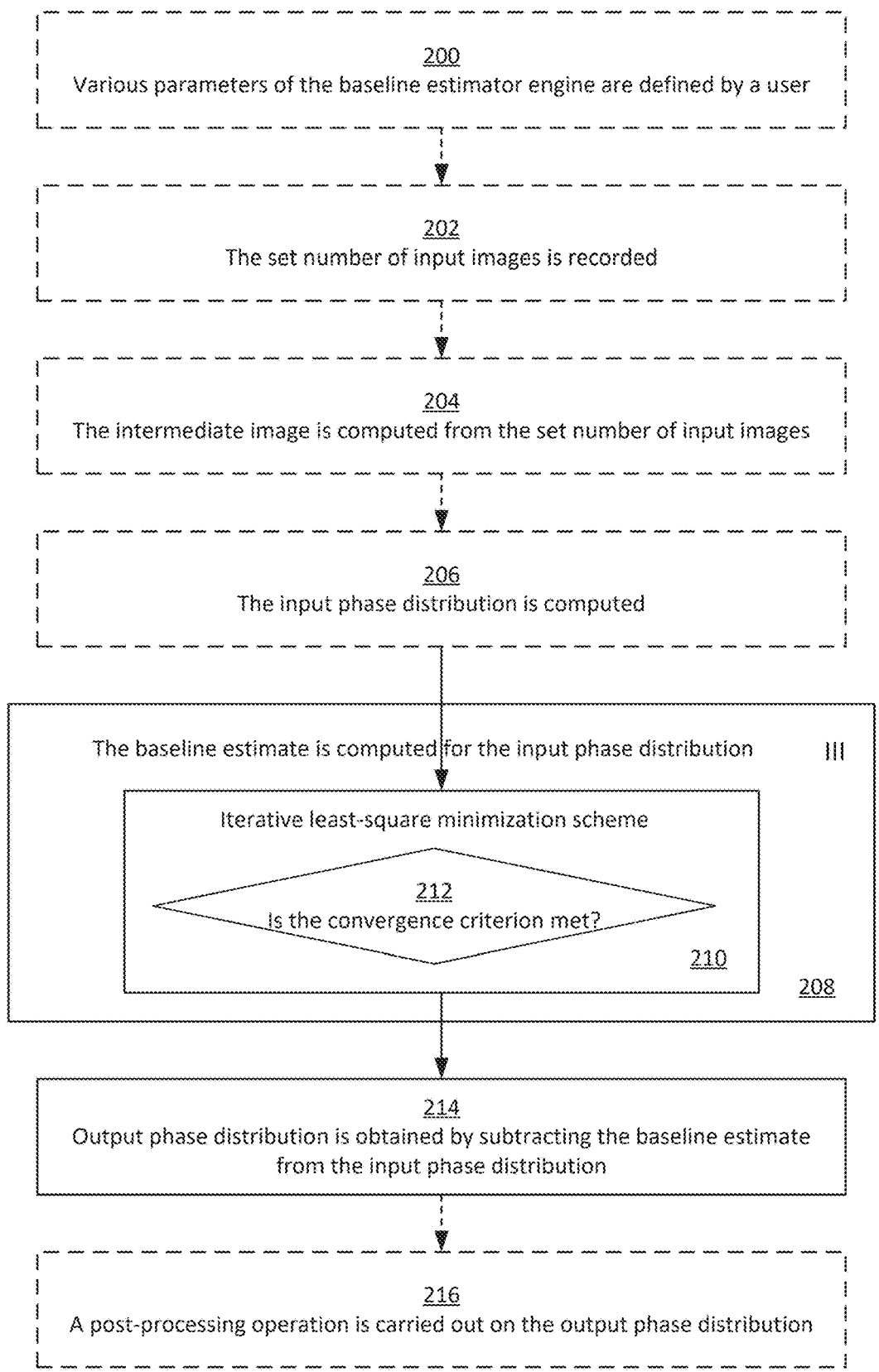
FIG. 2 shows a schematic rendition representation of a flow chart for the baseline removal of an input phase distribution.

With reference to FIG. 2, the steps of computing the output phase distribution $O(x_i)$ from the input phase distribution $I(x_i)$ or, optionally from a plurality of K input images $J_k(x_i)$ are described as they are performed by the apparatus 1.

In a first step 200, various parameters of the baseline estimator engine 42, which might be needed to be preset, may be defined by a user, e.g. using a graphical user interface 62 (FIG. 1). The parameters may comprise the type of fit to the input phase distribution $I(x_i)$ that is to be performed by the baseline estimator engine 42. For example, a user may choose between a polynomial fit and a spline fit of the baseline estimate 44 to the input phase distribution $I(x_i)$. The user may also set a length scale which may be used to separate the content component $I_1(x_i)$ from the noise component $I_2(X_i)$.

The user may further choose between recording the input images $J_k(x_i)$ using the camera or retrieving the input images from the storage section 20. The user may further select whether the intermediate image is to be computed from the input images $J_k(x_i)$ or retrieved from storage section 20. The user may further be prompted to select whether the input phase distribution $I(x_i)$ is to be retrieved from the storage section 20 or computed from a plurality of input images $J_k(x_i)$. The user may set the number of input images $J_k(x_i)$ and the parameters (defocus, illumination, exposure settings) that are to be changed automatically between the input images $J_k(x_i)$.

Further, the user may select values for the regularization parameters α and $\gamma_j$. The regularization parameter $\gamma_j$ may be chosen differently for each dimension, as explained further below.

Further, the user may choose between a variety of penalty terms $P(f(x_i))$ which are used in the minimization scheme. The penalty term $P(f(x_i))$ determines the shape of the baseline estimate 44 by penalizing the representation of components of the content component $I_1(x_i)$ in the baseline estimate 44. For example, the user may be presented with a selection of various penalty terms that penalize non-smooth characteristics of the baseline estimate 44. For instance, the penalty term may be a high-pass spatial frequency filter for the baseline estimate 44, which gets larger if the baseline estimate 44 contains components having high spatial frequency. Other penalty terms may include a gradient of the baseline estimate 44. Another example of a penalty term may be the curvature of the baseline estimate 44. Further, feature extracting filters, such as a Sobel, Laplace and/or FIR band-pass, high-pass or low-pass filter may be selected by the user as penalty terms. Further, a linear combination of any of the above may be selected. Different penalty terms may be selected for different dimensions.

The general representation of the penalty term is as follows:

$$P(f(x_i)) = \sum_{j=1}^{N} \gamma_j \sum_{i=1}^{N} \sum_{m=1}^{M_i} [\zeta^{(j)}(f(x_{i,m}))]^2$$

where $\zeta^{(j)}$ is a general operator of the penalty term, which defines the property of the penalty term.

In the following, it is assumed that the user selects a gradient-based roughness penalty term based on the gradient of the baseline estimate $f(x_{i,m})$ having the following form $$P(f(x_i)) = \sum_{j=1}^{N} \gamma_j \sum_{i=1}^{N} \sum_{m=1}^{M_i} (\partial_j f(x_{i,m}))^2$$

This penalty term penalizes large gradients in the baseline estimate. The operator $\partial_j$ represents a first-order derivative or gradient in the dimension j.

Using the above gradient-based penalty term, the parameters to be specified by the user may further comprise an array $\gamma_j$ of regularization parameters. The regularization parameter represents the square of the length scale, below which a structure in the input phase distribution is considered content. Structures in the input phase distribution $I(x_i)$ having a length larger than $\sqrt{\gamma_j}$ are considered noise. As is clear from the index j of $\gamma_j$, the regularization parameter and thus the length scale may be different in each dimension. Of course, there may also be used just one direction-independent feature length.

Further, when selecting a parameter for the baseline estimator engine 42, the user may choose between a symmetric quadratic term $\varphi(\varepsilon(x_i))$, which also determines the shape of the baseline estimate $f(x_{i,m})$ by specifying the effect of large peaks on the baseline estimate $f(x_{i,m})$.

Finally, the user may select a convergence criterion and/or a threshold value t which has to be reached by the convergence criterion.

For example, the user may select the following symmetric, truncated quadratic term:

$$\varphi(\varepsilon(x_i)) = \begin{cases} (I(x_i) - f(x_i))^2 & \text{if } |\varepsilon(x_i)| \le s \\ s^2 & \text{else} \end{cases}$$

in which s represents a threshold value which is to be input by the user. The threshold value defines a maximum deviation between the input phase distribution data $I(x_i)$ and the baseline estimate $f(x_i)$. Peaks above the baseline estimate $f(x_i)$ do not attract the baseline estimate $f(x_i)$ more than a peak which deviates by the threshold value.

If the user has opted to record the input images $J_k(x_i)$ using the apparatus 1, the set number of input images $J_1 \ldots _K (x_i)$ is recorded in step 202. Otherwise, the input images $J_k(x_i)$ are retrieved from the storage section 20.

If the user has opted to compute the intermediate image $I_f(x_i)$, the intermediate image $I_f(x_i)$ is computed by the apparatus 1 from the set number of input images $J(x_i)$, e.g. by subtraction in step 204. If the user has opted to use a saved intermediate image, it is downloaded from the storage section 20 at this step.

In step 206, the input phase distribution $I(x_i)$ is computed by the apparatus 1, e.g. using a Tikhonov regularization, or retrieved from the storage section 20, if the user has opted to use an input phase distribution that has already been computed. In this step, the phase point spread function $H(x_i)$ may be retrieved from the storage section 20.

In step 208, the baseline estimate is computed for the input phase distribution $I(x_i)$.

In particular computation of the baseline estimate may comprise an iterative quadratic minimization scheme 210 as explained above until a convergence criterion 212 is met. In the embodiment, the following convergence criterion is used:

$$\frac{\sum_{i=0}^{N} \sum_{m=0}^{M_i} |f_l(x_{i,m}) - f_{l-1}(x_{i,m})|}{\sum_{i=0}^{N} \sum_{m=0}^{M_i} (f_l(x_{i,m}) + f_{l-1}(x_{i,m}))} < t$$

where l indicates the current iteration and t is the constant scalar threshold value which may be user-specified.

If the convergence criterion 212 is met, it is assumed that the baseline estimate $f(x_i)$ has been successfully computed. Thus, in step 214 the output phase distribution $O(x_i)$ is obtained, e.g. by subtracting the baseline estimate $f(x_i)$ from the input phase distribution data $I(x_i)$.

After the computation of the output phase distribution $O(x_i)$ a post-processing operation 216 may be carried out on the output phase distribution data 36, such as a deconvolution, and/or the output phase distribution $O(x_i)$ may be displayed with or without post-processing on the display 37.

Figure 3:
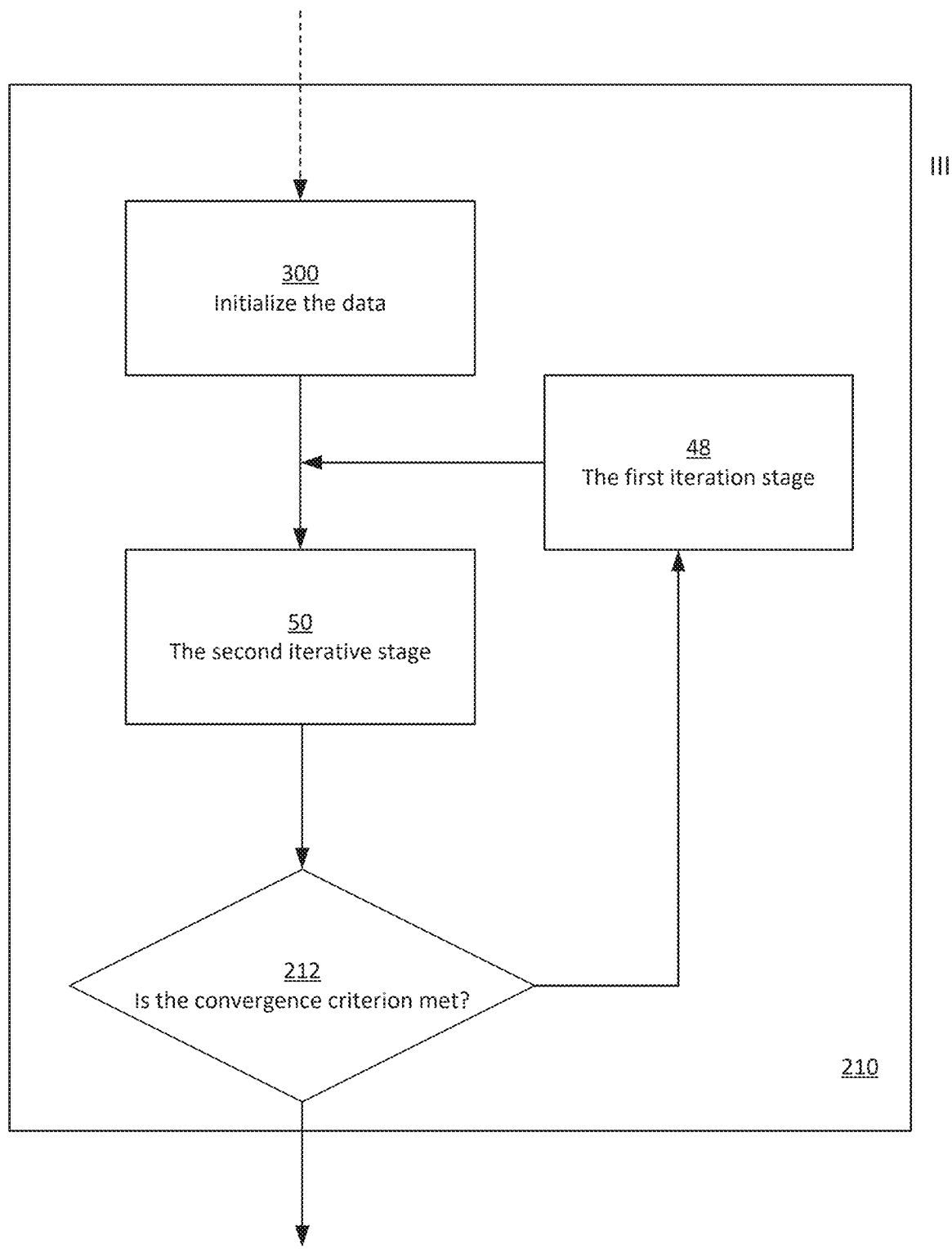
FIG. 3 shows detail III of FIG. 2.

In FIG. 3, detail III of FIG. 2 is shown to explain the minimization scheme 210 for computation of the baseline estimate $f(x_i)$ in closer detail. The minimization scheme 210 comprises the first iteration stage 48 and the second iteration stage 50.

In principle, the minimization scheme 210 as carried out by the minimization engine 46 may be the LEGEND algorithm. However, according to an embodiment of the invention it is preferred to modify the second step of the LEGEND algorithm to significantly reduce the computational burden.

In the shown embodiment, the second iterative stage 50 is entered after initializing the data at step 300. At this point, the first estimate $f_1(x_i)$ of the baseline estimate $f(x_i)$ is computed by using a convolution of the input phase distribution data $I(x_i)$ with a Green's function G $(x_i)$.

$$f_1(x_i) = G(x_i) * I(x_i)$$

For the gradient-based penalty term used in this embodiment, the Green's function is defined as follows:

$$G(x_{i,m}) = \mathcal{F}^{-1}\left[\frac{1}{1 - \sum_{j=1}^{N} \gamma_j \mathcal{F}[D_{i,m}^{(j)}]}\right]$$

where F [ . . . ] is the discrete N-dimensional Fourier transform, $F^{-1}$[ . . . ] is the inverse discrete N-dimensional Fourier transform, $\gamma_j$ is the regularization parameter of the roughness penalty term and $$D_{i,m}^{(j)} = \begin{cases} 2 & \text{if } m = 0 \text{ and } i = j \\ -1 & \text{if } m = 1 \text{ or } M_i, \text{ and } i = j \\ 0 & \text{else} \end{cases}$$

Then, in the first iteration stage 48, an updated version of auxiliary data $d_l(x_i)$ may be computed using the current baseline estimate $f_{l-1}(x_i)$ as follows:

$$d_l(x_i) = \begin{cases} (2\beta - 1)(I(x_i) - f_{l-1}(x_i)) & \text{if } \varepsilon(x_i) \le s \\ -I(x_i) + f_{l-1}(x_i) & \text{else} \end{cases}$$

The parameter β is a constant which may have been specified by the user. Typically β is in the range of 0.4-0.499.

Next, in the second iterative stage 50, the updated baseline estimate $f(x_i)$ is computed using the updated auxiliary data $d_l(x_i)$ of the current iteration l as follows:

$$f_l(x_i) = G(x_i) * (I(x_i) + d_l(x_i))$$

In the next step, it is checked whether the convergence criterion 212 is met. If this is not the case, the minimization scheme 210 proceeds to iterative step 48 using the updated baseline estimate $f_l(x_i)$.

Next, various exemplary embodiments of the apparatus 1 are shown that can be used for recording the plurality of input images $J_k(x_i)$. The various embodiments can be used separately or be used in any combination of the various features.

Figure 4:
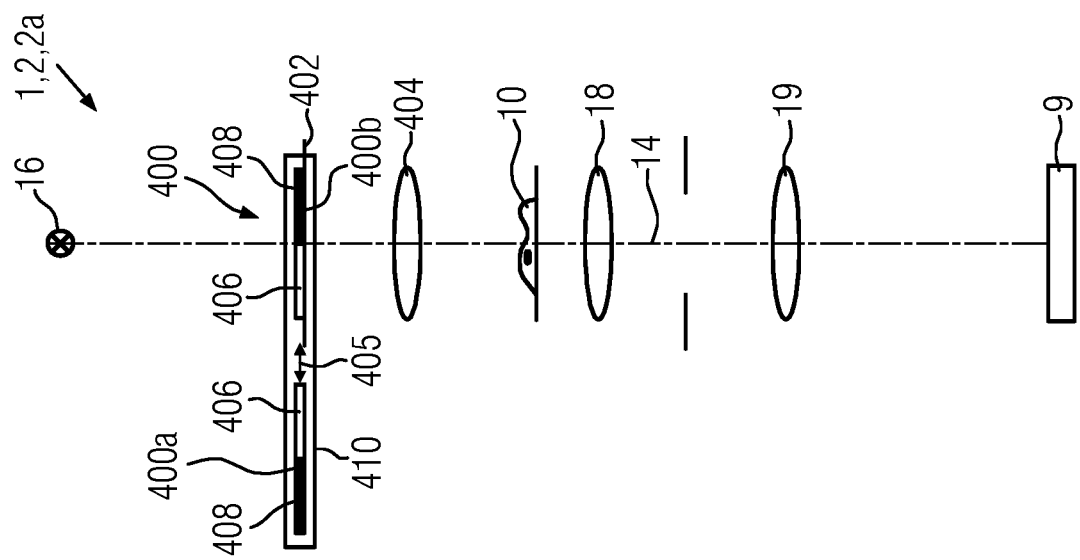
FIG. 4 shows a schematic representation of an embodiment of an apparatus for baseline removal in an input phase distribution.

FIG. 4 shows a schematic representation of an apparatus 1, which is configured to record the plurality of input images $J_k(x_i)$ using a different illumination for each of the input images $J_k(x_i)$. In particular, the illumination may be asymmetric. The differing illumination may be accomplished by e.g. using a preferably automatically controlled aperture 400 in a back focal plane 402 of a condenser 404. According to this embodiment, the apparatus 1 is configured to move the aperture 400 automatically into a different position for the illumination of each of the input images $J_k(x_i)$ as indicated by arrow 405. The aperture 400 preferably may comprise at least one asymmetrically arranged translucent sector 406 and at least one complimentary, asymmetrically arranged opaque sector 408. The aperture 400 may comprise a magazine 410 of different asymmetric apertures 400. The apparatus may be adapted to move different apertures 400 of the magazine 410 into the optical path 14 for recording a digital input image, using the image sensor/detector 9.

Figure 5:
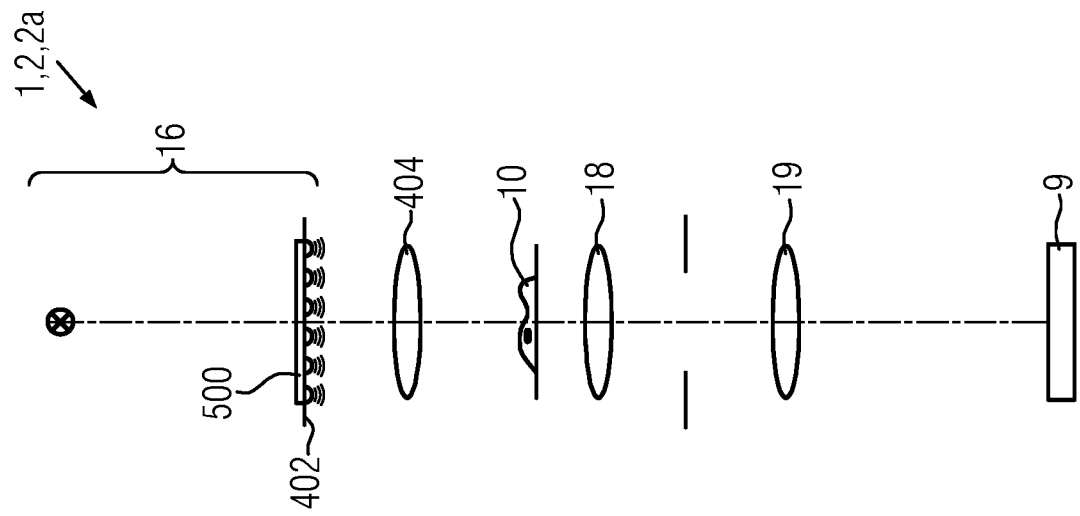
FIG. 5 shows another schematic representation of an embodiment of an apparatus for baseline removal in an input phase distribution.

Alternatively or additionally, the illumination system 16 may comprise individually controllable illumination elements 500 as shown in FIG. 5, which are preferably arranged also in a back focal plane 402 of a condenser 404. According to this embodiment, the apparatus 1 is configured to automatically switch on and/or off and/or to a different illumination intensity a different set of illumination elements 500, thus accomplishing a different illumination setting for each of the input images $J_k(x_i)$.

Figure 6:
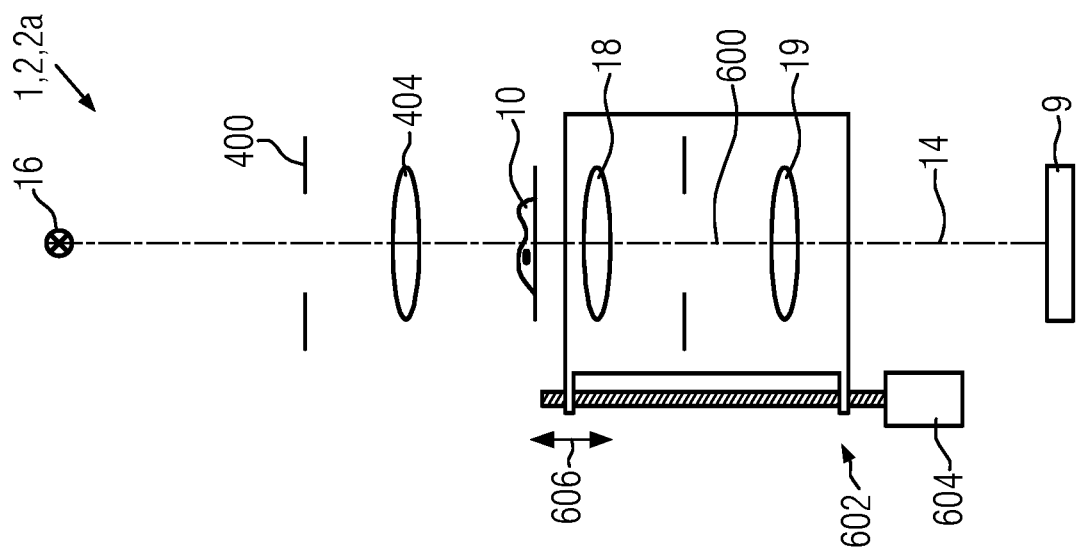
FIG. 6 shows another schematic representation of an embodiment of an apparatus for baseline removal in an input phase distribution.

Alternatively or additionally, the objective 18 and/or the tube lens 19 may be supported by the apparatus 1 to be movable along its optical axis 600 or the optical path 14, as shown in FIG. 6. The apparatus 1 may comprise a drive mechanism 602, such as a ballscrew drive, having an actuator 604, such as an electric motor. In this embodiment, the apparatus 1 is configured to automatically move the objective 18 and/or the tube lens 19 into a different position relative to the probe volume 12 for each of the input images $J_k(x_i)$, e.g. by operating the drive mechanism 602, as indicated by arrows 606.

Figure 7:
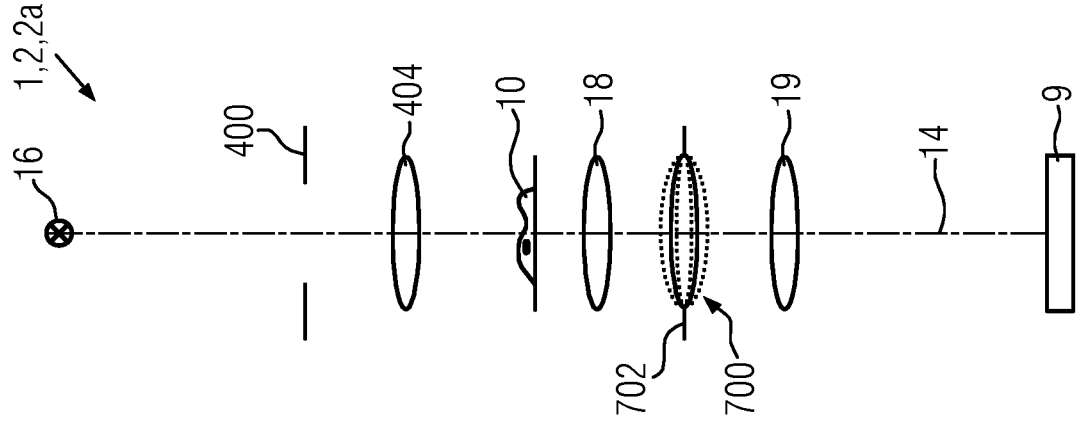
FIG. 7 shows another schematic rendition representation of an embodiment of an apparatus for baseline removal in an input phase distribution.

Alternatively or additionally, the apparatus 1, in particular the objective 18, may comprise a lens 700 having a variable focal length in a back focal plane 702 of the objective 18 or a conjugate place thereof. This is shown in FIG. 7. In this embodiment, the apparatus 1 is configured to automatically change the focal length of the lens 700 for each of the input images $J_k(x_i)$.

Figure 8:
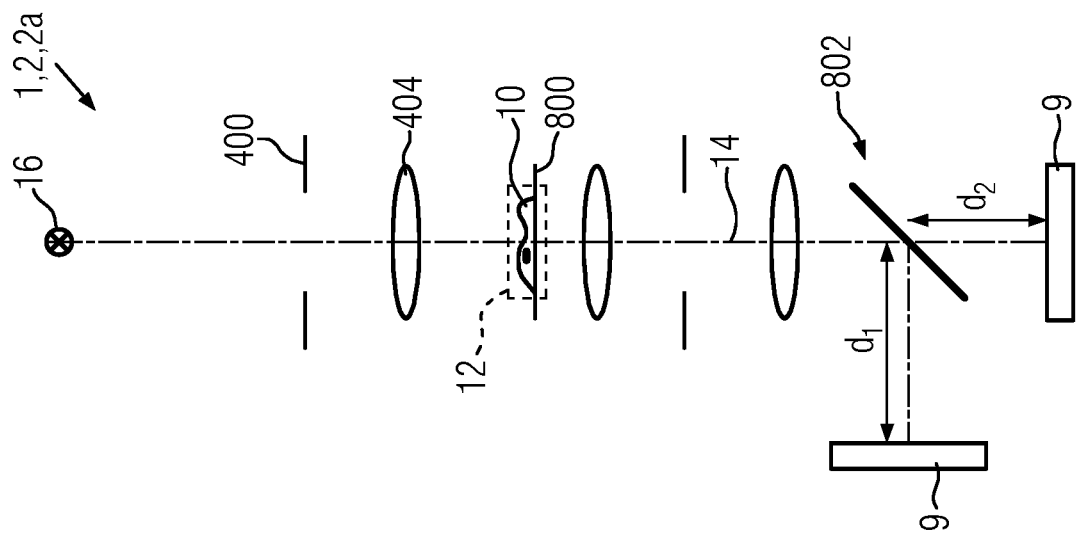
FIG. 8 shows another schematic representation of an embodiment of an apparatus for baseline removal in an input phase distribution.

Alternatively or additionally, the apparatus 1 may comprise two or more image sensors/detectors 9 that are arranged in a different distance $d_1$, $d_2$ from the image plane 800 or the probe volume 12, as shown in FIG. 8. The image sensors/detectors 9 may be held fixedly or movable in the apparatus 1. A beam splitting arrangement 802 may be used to guide the light simultaneously or alternatively to the at least two image sensors/detectors 9, and to split the optical path 14.

Figure 9:
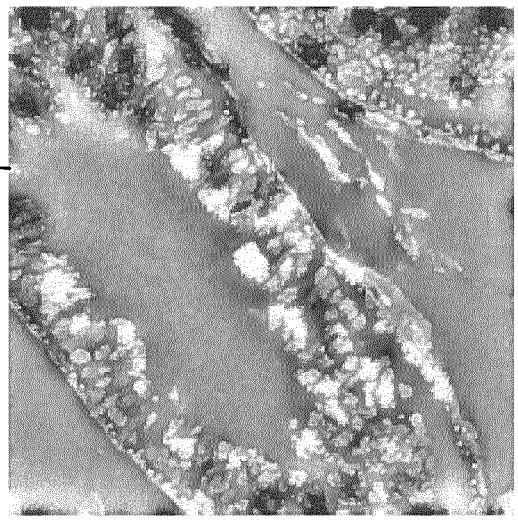
FIG. 9 shows a sample of an input phase distribution.

In FIG. 9, an input phase distribution $I(x_i)$ as obtained conventionally is shown. The low-frequency artifacts are visible as the very light and very dark areas.

Figure 10:
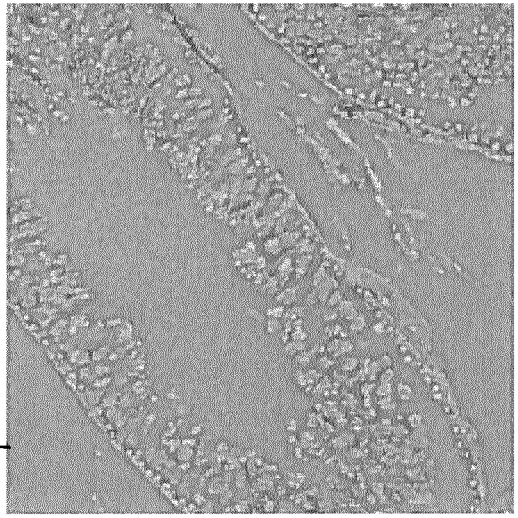
FIG. 10 shows an output phase distribution obtained from the input phase distribution of FIG. 9 after removal of the baseline estimate.

In FIG. 10, the output phase distribution $O(x_i)$ obtained from the removing of the baseline estimate $f(x_i)$ is shown. The dynamics of the image are more even than in FIG. 9 and details of the object 10 are not blurred by the low-frequency artifacts.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods de-scribed herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a micro-processor in order to perform one of the methods described herein. Generally, the methods are preferably performed by any hardware apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 1 apparatus
2 observation device
2a microscope
4 imaging system
6 input image data of input image I($x_i$)
8 camera
9 detector/image sensor
10 object
12 probe volume
13 field of view
14 optical path
15 well plate
16 illumination system
18 objective
19 tube lens
20 storage section
22 CPU
24 computing device
26 GPU
28 image input section
30 input connection device
32 image output section
34 output connection device
36 output phase distribution data, also O($x_i$)
37 display
38 image processor
40 regularization engine
42 baseline estimator engine
44 baseline estimate $f(x_i)$
46 minimization engine
48 first iteration stage
50 second iteration stage
62 graphical user interface
200 setup of baseline estimate parameters
202 recording or retrieving input images
204 computing or retrieving intermediate image
206 computing or retrieving the input phase distribution
208 computing the baseline estimate
210 minimization scheme
212 convergence criterion
214 obtaining the output phase distribution
216 post-processing operation
300 initializing baseline regularization
400, 400a, 400b aperture
402 back focal plane
404 condenser
405 arrow
406 translucent sector
408 opaque sector
410 magazine
500 illumination element
600 optical axis
602 drive mechanism
604 actuator
606 arrows
700 lens having variable focal length
702 back focal plane of objective
800 image plane
802 beam splitting arrangement

The invention claimed is:

1. An apparatus for enhancing an input phase distribution (I($x_i$)), the apparatus being configured to:
record two or more digital input images ($J_k(x_i)$) using, for each of the two or more digital input images ($J_k(x_i)$), one of a different focal length, a different illumination, a different distance of an objective lens from a probe volume and a different length of an optical path from an image sensor to the probe volume;
retrieve a phase transfer function $\mathcal{F}(H(x_i))$;
obtain an intermediate image by subtracting the two or more digital input images from one another;

obtain the input phase distribution ($I(x_i)$) based on the intermediate image and the phase transfer function $\mathcal{F}(H(x_i))$;

compute a baseline estimate ($f(x_i)$) as an estimate of a baseline ($I_2(x_i)$) representing noise in the input phase distribution ($I(x_i)$) by an iterative minimization scheme, wherein the iterative minimization scheme uses a least-square minimization criterion that includes a penalty term, wherein the penalty term penalizes a non-smooth base line estimate; and obtain an output phase distribution ($O(x_i)$) based on the baseline estimate ($f(x_i)$) and the input phase distribution ($I(x_i)$) by subtracting the baseline estimate ($f(x_i)$) from the input phase distribution ($I(x_i)$), thereby reducing the noise in the input phase distribution ($I(x_i)$).

2. The apparatus according to claim 1, wherein the least-square minimization criterion comprises a truncated quadratic term ($\varphi(\varepsilon(x_i))$).

3. The apparatus according to claim 2, wherein the truncated quadratic term ($\varphi(\varepsilon(x_i))$) is symmetric.

4. The apparatus according to claim 1, wherein the iterative minimization scheme comprises a first iterative stage and a second iterative stage, wherein, in the first iterative stage, auxiliary data ($d_i(x_i)$) are updated depending on the baseline estimate ($f_{l-1}(x_i)$) of a previous iteration (l), a truncated quadratic term ($\varphi(\varepsilon(x_i))$) and the input phase distribution ($I(x_i)$) and, in the second iterative stage, the baseline estimate ($f(x_i)$) is computed using a convolution of a discrete Green's function ($G(x_i)$) with a sum of the input phase distribution ($I(x_i)$) and the updated auxiliary data ($d(x_i)$).

5. The apparatus according to claim 1, wherein the apparatus is configured to compute the input phase distribution ($I(x_i)$) using a regularization function R.

6. The apparatus according to claim 1, wherein the two or more digital input images ($J_k(x_i)$) are bright field images.

7. The apparatus according to claim 1, wherein the apparatus comprises at least one of:
a controllable aperture in a back focal plane of an objective;
an illumination system, which is configured to be switched to at least two different illumination settings, a probe volume being illuminated differently in each of the at least two illumination settings;
an optical path extending from the probe volume to at least one image sensor, the optical path having a variable length;
an imaging system comprising at least one imaging sensor, which is movable relative to the imaging system, being configured to record two or more digital input images ($J_k(x_i)$), each of the two or more digital input images ($J_k(x_i)$) being recorded at a different distance from the probe volume;
at least two image sensors arranged at a different distance from the probe volume; and
an objective having at least one of:
an optical axis, the objective being movable relative to the probe volume along the optical axis; and
a lens having variable focal length.

8. A microscope comprising the apparatus according to claim 1.

9. A method for enhancing an input phase distribution ($I(x_i)$), the method comprising:
retrieving at least two digital input images (($J_k(x_i)$) and a phase transfer function $\mathcal{F}(H(x_i))$;

obtaining an intermediate image by subtracting the at least two digital input images from one another;

computing the input phase distribution ($I(x_i)$) from the phase transfer function $\mathcal{F}(H(x_i))$ and the intermediate image using a regularization function R;

estimating a baseline ($I_2(x_i)$) representing noise in the input phase distribution ($I(x_i)$) to obtain a baseline estimate ($f(x_i)$) by an iterative minimization scheme, wherein the iterative minimization scheme uses a least-square minimization criterion that includes a penalty term, wherein the penalty term penalizes a non-smooth base line estimate; and obtaining an output phase distribution ($O(x_i)$) based on the baseline ($I_2(x_i)$) and the input phase distribution by subtracting the baseline estimate ($f(x_i)$) from the input phase distribution ($I(x_i)$), thereby reducing the noise in the input phase distribution ($I(x_i)$).

10. The method according to claim 9, further comprising recording the at least two digital input images ($J_k(x_i)$) as bright-field microscopic images.

11. A tangible, non-transitory computer-readable medium having instructions thereon, which, upon being executed by one or more processors, provides for execution of the method according to claim 9.

12. The method according to claim 9, further comprising training a neural network device using the output phase distribution.

13. The method according to claim 9, further comprising storing the output phase distribution ($O(x_i)$) on a non-transitory computer-readable medium.

14. An apparatus for enhancing an input phase distribution ($I(x_i)$), the apparatus being configured to:
retrieve the input phase distribution ($I(x_i)$);
compute a baseline estimate ($f(x_i)$) as an estimate of a baseline ($I_2(x_i)$) representing noise in the input phase distribution ($I(x_i)$) by an iterative minimization scheme, wherein the iterative minimization scheme comprises a first iterative stage and a second iterative stage, wherein, in the first iterative stage, auxiliary data ($d_i(x_i)$) are updated depending on the baseline estimate ($f_{l-1}(x_i)$) of a previous iteration (l), a truncated quadratic term ($\varphi(\varepsilon(x_i))$) and the input phase distribution ($I(x_i)$) and, in the second iterative stage, the baseline estimate ($f(x_i)$) is computed using a convolution of a discrete Green's function ($G(x_i)$) with a sum of the input phase distribution ($I(x_i)$) and the updated auxiliary data ($d(x_i)$), wherein the iterative minimization scheme uses a least-square minimization criterion that includes a penalty term, wherein the iterative minimization scheme uses a least-square minimization criterion that includes a penalty term, wherein the penalty term penalizes a non-smooth base line estimate, so that the baseline estimate ($f(x_i)$) represents a component of the input phase distribution that has low spatial frequency; and obtain an output phase distribution ($O(x_i)$) based on the baseline estimate ($f(x_i)$) and the input phase distribution ($I(x_i)$) by subtracting the baseline estimate ($f(x_i)$) from the input phase distribution ($I(x_i)$), thereby reducing the noise in the input phase distribution ($I(x_i)$).

15. The method according to claim 9, further comprising generating an output image based on the output phase distribution ($O(x_i)$).

* * * * *